(12) United States Patent
Ju et al.

(10) Patent No.: US 11,067,842 B2
(45) Date of Patent: Jul. 20, 2021

(54) CONTRAST RATIO IMPROVING OPTICAL FILM, POLARIZING PLATE COMPRISING SAME, AND LIQUID CRYSTAL DISPLAY DEVICE COMPRISING SAME

(71) Applicant: SAMSUNG SDI CO., LTD., Yongin-si (KR)

(72) Inventors: Young Hyun Ju, Suwon-si (KR); Dae Seob Shim, Suwon-si (KR); Young Oh, Suwon-si (KR); Dong Ho Wee, Suwon-si (KR); Jeong Ho Lee, Suwon-si (KR); Yong Un Jung, Suwon-si (KR); Jang Hyun Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/487,362

(22) PCT Filed: Nov. 27, 2017

(86) PCT No.: PCT/KR2017/013599
§ 371 (c)(1),
(2) Date: Aug. 20, 2019

(87) PCT Pub. No.: WO2018/155792
PCT Pub. Date: Aug. 30, 2018

(65) Prior Publication Data
US 2020/0057333 A1 Feb. 20, 2020

(30) Foreign Application Priority Data
Feb. 21, 2017 (KR) .................. 10-2017-0023196

(51) Int. Cl.
*G02F 1/1335* (2006.01)
*B32B 27/08* (2006.01)

(52) U.S. Cl.
CPC ........ *G02F 1/133504* (2013.01); *B32B 27/08* (2013.01); *G02F 2201/08* (2013.01); *G02F 2201/38* (2013.01)

(58) Field of Classification Search
CPC ........ G02F 1/133504; G02F 2201/118; G02F 2201/18
See application file for complete search history.

(56) References Cited

U.S. PATENT DOCUMENTS

2008/0165542 A1 7/2008 Kim et al.
2016/0341853 A1 11/2016 Zhang

FOREIGN PATENT DOCUMENTS

CN 105929476 A 9/2016
JP 2006-251659 A 9/2006
(Continued)

OTHER PUBLICATIONS

Chinese Office Action from corresponding Chinese Patent Application No. 201780089825.7, Chinese Office action dated Feb. 2, 2021 (9 pgs.).

*Primary Examiner* — Richard H Kim
(74) *Attorney, Agent, or Firm* — Lewis Roca Rothgerber Christie LLP (57) ABSTRACT

Provided are a contrast ratio improving optical film, a polarizing plate comprising the same, and a liquid crystal display device comprising the same, wherein the contrast ratio improving optical film comprises a contrast ratio improving layer. The contrast ratio improving layer comprises a first resin layer and a second resin layer which faces the first resin layer, wherein the second resin layer comprises a pattern part having optical patterns and a flat part between the optical patterns. The optical patterns have at least one inclined surface with respect to the flat part, and the flat part or the inclined surface has a light absorption layer formed thereon. The contrast ratio improving optical film has a lowest reflectance of 0.5% or less.

19 Claims, 3 Drawing Sheets

(56) References Cited

FOREIGN PATENT DOCUMENTS

| | | |
|---|---|---|
| JP | 2016-33663 A | 3/2016 |
| KR | 10-2016-0081784 A | 7/2016 |
| KR | 10-1659241 A | 9/2016 |

CONTRAST RATIO IMPROVING OPTICAL FILM, POLARIZING PLATE COMPRISING SAME, AND LIQUID CRYSTAL DISPLAY DEVICE COMPRISING SAME

CROSS-REFERENCE TO RELATED APPLICATION(S)

This application is a U.S. National Phase Patent Application of International Application Number PCT/KR2017/013599, filed on Nov. 27, 2017, which claims priority to Korean Patent Application Number 10-2017-0023196, filed on Feb. 21, 2017, the entire contents of both of which are incorporated herein by reference.

TECHNICAL FIELD

The present invention relates to a contrast ratio improving optical film, a polarizing plate including the same, and a liquid crystal display device including the same, and more particularly, to a contrast ratio improving optical film for a liquid crystal display (LCD), a polarizing plate including the same, and a liquid crystal display device including the same.

BACKGROUND ART

A liquid crystal display operates by emitting light originating from a backlight unit through a liquid crystal panel. Since light emitted from a backlight unit is perpendicularly incident on the screen of a liquid crystal display, the liquid crystal display has a lower contrast ratio (CR) at lateral sides of the screen than at the front side thereof. Accordingly, research is being conducted on a contrast ratio improving optical film capable of increasing a lateral contrast ratio.

Generally, a contrast ratio improving optical film improves a contrast ratio by means of an optimal pattern. For example, the contrast ratio may be improved by an optimal film in which a flat part and an optical pattern are alternately formed. An optical pattern has an inclined surface to improve a contrast ratio by refracting and diffusing incident light on the inclined surface, and a flat part may diffuse the light and maintain brightness thereof by emitting light reaching the flat part. However, a portion of the light reaching the flat part is totally reflected on the inclined surface immediately adjacent to the flat part, and thus a front contrast ratio may be decreased. Accordingly, there is a need for a contrast ratio improving optical film capable of minimizing a decrease in the front contrast ratio while increasing the lateral contrast ratio.

Meanwhile, the liquid crystal display may not be in a driving state continuously but may be in a non-driving state. When the liquid crystal display is in the non-driving state, external light such as sunlight or illumination is emitted to the screen of the liquid crystal display. In this case, stains or mura may appear on the screen, or reflected light may be split. As a result, black visibility of the liquid crystal display may be reduced, and the appearance thereof will be degraded.

Accordingly, there is a need for a polarizing plate capable of enhancing both of the lateral contrast ratio and the front contrast ratio in the driving state and capable of removing the reduction in black visibility and the degradation in appearance in the non-driving state.

The background of the present invention is disclosed in Japanese Laid-Open Patent No. 2006-251659.

DISCLOSURE

Technical Problem

An object of the present invention is to provide a contrast ratio improving optical film capable of enhancing appearance by improving black visibility and preventing rainbow mura or stains from being recognized even when external light such as sunlight or illumination is emitted while the liquid crystal display device is not driven.

Another object of the present invention is to provide a contrast ratio improving optical film capable of increasing a lateral contrast ratio and minimizing a decrease in front contrast ratio.

Still another object of the present invention is to provide a polarizing plate including the contrast ratio improving optical film of the present invention.

Technical Solution

A contrast ratio improving optical film of the present invention may include a contrast ratio improving layer, wherein the contrast ratio improving layer may include a first resin layer and a second resin layer facing the first resin layer, the second resin layer may include a pattern part having optical patterns and a flat part between the optical patterns, the optical patterns may have at least one inclined surface with respect to the flat part, and the flat part or the inclined surface may have a light absorption layer formed thereon, and the contrast ratio improving optical film may have a minimal reflectance of 0.5% or less.

A polarizing plate of the present invention may have a polarizing film and a contrast ratio improving optical film sequentially stacked, the contrast ratio improving optical film may have the contrast ratio improving optical film of the present invention, and the polarizing plate of the present invention may have a contrast ratio gain of 1.05 or more in the following Equation 2:

Contrast ratio gain=Lateral relative contrast ratio× Front relative contrast ratio        [Equation 2]

wherein the front relative contrast ratio and the lateral relative contrast ratio are the same as described in the detailed description of the present invention.

The liquid crystal display device of the present invention may include the polarizing plate of the present invention.

Advantageous Effects

According to the present invention, it is possible to provide a contrast ratio improving optical film capable of enhancing appearance by improving black visibility and preventing rainbow mura or stains from being recognized even when external light such as sunlight or illumination is emitted while the liquid crystal display device is not driven.

According to the present invention, it is possible to provide a contrast ratio improving optical film capable of increasing a lateral contrast ratio and minimizing a decrease in front contrast ratio.

According to the present invention, it is possible to provide a polarizing plate including the contrast ratio improving optical film of the present invention.

BEST MODE

Hereinafter, exemplary embodiments of the present invention will be described in detail with reference to the accompanying drawings so that they can be easily practiced by those skilled in the art. The present invention may be embodied in many different forms and should not be construed as being limited to the embodiments set forth herein. Also, portions irrelevant to the description of the present invention will be omitted for clarity. Moreover, the same or similar elements are designated by the same reference numerals throughout the specification.

Herein, spatially relative terms such as "upper" and "lower" are defined with reference to the accompanying drawings. Therefore, depending on the viewpoint, the terms "upper" and "lower" may be used interchangeably. In addition, when an element is referred to as being "on" another element, the former may be formed on the latter directly or with any intervening elements. In contrast, when an element is referred to as being "directly on," "immediately above," "directly formed on," or "formed directly adjacent to" element, there are no intervening elements present.

Herein, a horizontal direction and a vertical direction refer to a longitudinal direction and a transverse direction of the rectangular screen of a liquid crystal display, respectively. Herein, a front side and a lateral side refer to (0°, 0°) and (0°,60°), which are coordinates (φ, θ) in the spherical coordinate system with respect to the horizontal direction. In this case, a leftmost point is (180°,90°), and a rightmost point is (0°,90°).

Herein, an uppermost part refers to the highest part of an engraved optical pattern.

Herein, an aspect ratio refers to a ratio of the maximal height to the maximal width (maximal height/maximal width) of an optical pattern.

Herein, a periodic interval refers to the distance between neighboring optical patterns, for example, the sum of the width of one flat part and the maximal width of one optical pattern.

Herein, an in-plane retardation Re is a value at a wavelength of 550 nm and is represented by the following Equation A:

$$Re=(nx-ny)\times d \quad \text{[Equation A]}$$

wherein nx and ny are refractive indices at a wavelength of 550 nm in a lagging axis direction and a leading axis direction of a corresponding protective layer or base layer, respectively, and d is the thickness of the corresponding protective layer or base layer (in units of nm).

Herein, "minimal reflectance" of a contrast ratio improving optical film refers to a lowest value of reflectance that is measured at a wavelength of 320 nm to 800 nm in a reflective mode by a measuring instrument with respect to a specimen manufactured by laminating a black acrylic sheet (Nitto Jushi Kogyo, CLAREX) on one surface of a first resin layer of a contrast ratio improving optical film. The minimal reflectance is a value that is measured in a second resin layer or a protective layer of the contrast ratio improving optical film.

Herein, the term "radius of curvature" of a curved surface of an optimal pattern refers to the radius of a virtual circle having the curved surface as a portion thereof.

Herein, the term "(meth)acryl" refers to acryl and/or methacryl.

Figure 1:
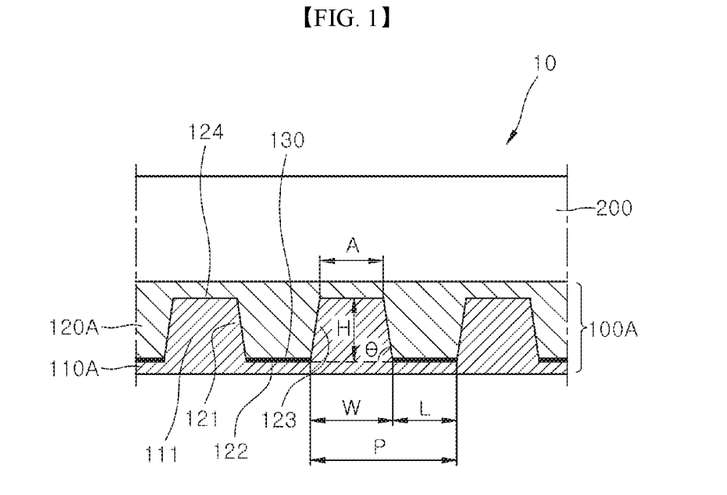
FIG. 1 is a sectional view of a contrast ratio improving film according to an embodiment of the present invention.

A contrast ratio improving optical film according to an embodiment of the present invention will be described below with reference to FIG. 1. FIG. 1 is a sectional view of the contrast ratio improving optical film according to an embodiment of the present invention.

Referring to FIG. 1, a contrast ratio improving optical film 10 may include a contrast ratio improving layer 100A and a protective layer 200.

The contrast ratio improving optical film 10 may include a contrast ratio improving layer 100A in which a light absorption layer is formed on a flat part or an inclined surface. Accordingly, the contrast ratio improving optical film 10 can increase both of a front contrast ratio and a lateral contrast ratio by increasing a lateral relative contrast ratio relative to an optical film (a protective layer alone) in which the contrast ratio improving layer is not formed and also by maintaining a front relative contrast ratio or minimizing a decrease in the front relative contrast ratio to increase a contrast ratio gain value of the following Equation 2.

The contrast ratio improving optical film 10 may have a minimal reflectance of 0.5% or less. The minimal reflectance may be further lowered by a light absorption layer being formed on a flat part or an inclined surface. For example, the minimal reflectance of the contrast ratio improving optical film 10 may be 0.3% or less, less than 0.3%, or in a range of 0% to 0.3%. In the above range, even when external light such as sunlight or illumination is emitted, it is possible to enhance appearance by improving black visibility and preventing rainbow mura or stains from being recognized. When the light absorption layer is formed on the flat part, the minimal reflectance of the contrast ratio improving optical film may be significantly further reduced. As the minimal reflectance decreases, the above-described appearance improvement and black visibility enhancement may increase.

Contrast Ratio Improving Layer

The contrast ratio improving layer 100A includes a first resin layer 110A, a second resin layer 120A facing the first resin layer 110A, and a light absorption layer 130 formed between the first resin layer 110A and the second resin layer 120A.

The second resin layer 120A includes an optical pattern 121 and a flat part 122 between neighboring optical patterns 121. The optical pattern 121 includes one or more inclined surfaces 123 with respect to the flat part 122. A light absorption layer 130 is provided on at least a portion of the flat part 123, and no light absorption layer is provided on the inclined surface 123. Accordingly, the contrast ratio improving layer prevents total reflection on the inclined surfaces by the light absorption layer of the flat part absorbing light incident from the first resin layer. Thus, it is possible to minimize a decrease in the front contrast ratio and increase the lateral contrast ratio compared to a contrast ratio improving layer having no light absorption layer. A contrast ratio improving optical film having no light absorption layer formed on both of the flat part and the inclined surface cannot obtain the advantageous effects of the prevent invention due to low front contrast ratio. A contrast ratio improving optical film having such light absorption layers formed on both of the inclined surface and the flat part has a low lateral contrast ratio and thus is difficult to use as an optical film with an improved contrast ratio. The "inclined surface" refers to a surface that is inclined with respect to the flat part in the range of a base angle θ, which will be described below, and that is directly connected to the flat part.

Second Resin Layer

The second resin layer 120A is formed on the first resin layer 110A and formed on a light exit surface of the first resin layer 110A. At least a portion of the second resin layer 120A is formed directly on the first resin layer 110A. The second resin layer 120A can increase light diffusion by diffusing light incident from the light exit surface of the first resin layer 110A.

The second resin layer 120A includes a pattern part having one or more optical patterns 121 and a flat part 122 formed between neighboring optical patterns 121. A corresponding optical pattern 121 includes one or more inclined surfaces 123 with respect to the flat part 122. FIG. 1 shows that the optical pattern 121 is an engraved pattern.

The pattern part may satisfy the following Equation 1, and the optical pattern 121 may have a base angle θ ranging from 75° to 90°. The base angle θ means that the angle between the inclined surface 123 of the optical pattern 121 and the line of the maximal width W of the optical pattern 121 ranges from 75° to 90°. In the above range, it is possible to increase relative luminance at the front side, improve both of the front contrast ratio and the lateral contrast ratio, decrease the difference between the front contrast ratio and the lateral contrast ratio, and also increase the contrast ratio at the same lateral viewing angle and the same front viewing angle. In detail, the base angle θ may range from 80° to 90°, and P/W may range from 1.2 to 8.

$$1 < P/W \leq 10 \quad \text{[Equation 1]}$$

wherein P is a periodic interval of the pattern part (in units of μm), and

W is the maximal width of the optical pattern (in units of μm).

FIG. 1 shows that both base angles of the optical pattern are equal to each other. However, a pattern having different base angles may fall within the scope of the present invention when the base angles are in the range of 75° to 90°.

The optical pattern 121 may be an optical pattern having a first surface 124 formed at an uppermost part and one or more inclined surfaces 123 connected to the first surface 124. FIG. 1 shows a trapezoidal optical pattern in which two neighboring inclined surfaces 123 are connected to each other by the first surface 124, but the present invention is not limited thereto.

The first surface 124 is formed at the uppermost part so that light reaching the second resin layer 120A may further be diffused by the first surface 124, and thus the optical display device can improve the viewing angle and the luminance. Accordingly, the polarizing plate may increase light diffusion and thus minimize luminance loss.

The first surface 124 may be a flat surface to facilitate a process of manufacturing the contrast ratio improving optical film. However, the first surface 124 may have a concave-convex part or may be curved. When the first surface is formed to be curved, a lenticular lens pattern may be formed.

The first surface 124 may be formed in parallel to one or more of the flat part 122, a lowermost surface of the first resin layer 110A, and an uppermost surface of the second resin layer 120A. FIG. 1 shows that the first surface 124 of the optical pattern 121, the flat part 122, the lowermost surface of the first resin layer 110A, and the uppermost surface of the second resin layer 120A are parallel to each other.

The first surface 124 may have a width A ranging from 0.5 μm to 30 μm and specifically from 2 μm to 20 μm. FIG. 1 shows an engraved pattern having one flat surface formed at the uppermost part, an inclined surface formed to be flat, and a section formed in the shape of a trapezoid (e.g., a cut-prism shape in which an upper portion of a triangular prism is cut off). However, an engraved pattern having a first surface formed at the uppermost part and an inclined surface formed to be curved (e.g., a cut-lenticular lens in which an upper portion of a lenticular lens pattern is cut off, or a cut-micro lens in which an upper portion of a micro-lens pattern is cut off) may fall within the scope of the invention. Alternatively, the section of the optical pattern may be a polygon having N angles (here, N is an integer ranging from 3 to 20) such as a rectangle or a square.

The optical pattern 121 may have an aspect ratio H/W ranging from 0.3 to 3.0, specifically from 0.4 to 2.7 or from 0.4 to 2.8, and more specifically from 0.4 to 2.5. In the above range, the optical display device can improve the contrast ratio and the viewing angle at the lateral side.

The optical pattern 121 may have a maximal height H of 40 μm or less, specifically 30 μm or less, and more specifically from 3 μm to 20 μm or from 3 μm to 15 μm. In the above range, it is possible to improve the contrast ratio, the viewing angle, and the luminance and also to prevent a moiré or the like. FIG. 1 shows that the optical patterns of the pattern part have the same maximal height. However, the optical patterns may have different heights, or at least one of neighboring optical patterns may have a different height.

The optical pattern 121 may have a maximal width of 80 μm or less, specifically 50 μm or less, and more specifically from 5 μm to 20 μm or from 10 μm to 30 μm. In the above range, it is possible to improve the contrast ratio, the viewing angle, and the luminance and also to prevent the moiré or the like.

FIG. 1 shows that the optical patterns of the pattern part have the same maximal width. However, the engraved optical patterns may have different maximal widths, or at least one of neighboring patterns may have a different maximal width of an engraved pattern.

The flat part 122 provides a space formed between an optical pattern 121 and a neighboring optical pattern 121 to form the light absorption layer 130. The light absorption layer 130 is formed directly on the flat part 122.

The ratio of the maximal width W of the optical pattern 121 to the width L of the flat part 122 may be 9 or less, specifically from 0.1 to 3, and more specifically from 0.15 to 2.5. In the above range, it is possible to increase relative luminance at the front side, decrease the difference between the front contrast ratio and the lateral contrast ratio, and also increase the contrast ratio at the same lateral viewing angle and the same front viewing angle. Also, it is possible to prevent the moiré.

The flat part 122 may have a width L ranging from 1 μm to 300 μm and specifically from 3 μm to 50 μm. In the above range, it is possible to increase front luminance.

The maximal width W of one optical pattern 121 and a directly neighboring flat part 122 form one periodic interval P.

The periodic interval P may range from 5 μm to 500 μm and specifically from 10 μm to 50 μm. In the above range, it is possible to enhance the luminance and improve the contrast ratio while preventing the moiré. FIG. 1 shows that neighboring optical patterns have the same periodic interval. However, the optical patterns may have different periodic intervals, or at least one of neighboring patterns may have a different periodic interval.

FIG. 1 shows that the optical pattern is an engraved pattern. However, the optical pattern may be an embossed pattern.

Although not shown in FIG. 1, the optical pattern is formed to extend in a stripe shape, but the optical pattern may be formed in a dot shape. The "dot" refers to distribution of a combination of a filling pattern and an optical pattern.

The second resin layer 120A has a higher refractive index than the first resin layer 110A. Accordingly, the contrast ratio improving layer 100A diffuses light incident from a light entrance surface of the first resin layer 110A and emits the diffused light. Thus, it is possible to increase relative luminance at the front side, improve both of the front contrast ratio and the lateral contrast ratio, minimize a decrease in the front contrast ratio while increasing the lateral contrast ratio, decrease the difference between the front contrast ratio and the lateral contrast ratio, and also increase the contrast ratio at the same lateral viewing angle and the same front viewing angle. Also, it is possible to lower a minimal reflectance along with the light absorption layer formed between the second resin layer and the first resin layer.

The difference in refractive index between the second resin layer 120A and the first resin layer 110A (the refractive index of the second resin layer—the refractive index of the first resin layer) may range from 0.05 to 0.20 and specifically from 0.06 to 0.15. In the above range, it is possible to increase the diffusion of collected light and improve the contrast ratio. In particular, the contrast ratio improving layer having a refractive index difference of 0.06 to 0.15 has excellent polarization diffusion in an optical display device, and thus it is possible to increase luminance even at the same viewing angle.

The second resin layer 120A may have a refractive index of 1.50 or more and specifically from 1.50 to 1.70 or from 1.50 to 1.60. In the above range, the light diffusion can be excellent. The second resin layer 120A may be formed of an ultraviolet (UV) curable composition or a thermosetting composition containing one or more of (meth)acrylic resins, polycarbonate-based resins, silicone-based resins, and epoxy-based resins, but the present invention is not limited thereto.

Light Absorption Layer

The light absorption layer 130 is formed on at least a portion of the flat part 122.

FIG. 1 shows that the light absorption layer 130 is formed on the entirety of the flat part 122. However, the light absorption layer 130 may be formed on a portion of the flat part 122. The light absorption layer 130 may be formed to occupy 50% to 100% and, for example, 60% to 100% of the total area of the flat part 122. In the above range, it is possible to minimize a decrease in the front contrast ratio. FIG. 1 shows that the light absorption layer 130 is continuously formed on the flat part 122. However, the light absorption layer 130 may be discontinuously formed on the flat part 122.

The light absorption layer 130 is discontinuously formed on a portion of a surface facing the first resin layer and the second resin layer which have different refractive indices. Thus, it is possible to secure the minimal reflectance of the contrast ratio improving film to 0.5% or less and further lower the minimal reflectance. The minimal reflectance may be lowered further when the light absorption layer is formed on the flat part than when the light absorption layer is formed on the inclined surface.

The light absorption layer 130 may be formed to occupy 10% to 50% and, for example, 15% to 40%, of the total area of the surface facing the first resin layer and the second resin layer. In the above range, it is possible to increase the lateral contrast ratio and also minimize the decrease in front contrast ratio.

By the light absorption layer 130 absorbing light reaching the flat part 122 from the first resin layer 110A to prevent total reflection on the inclined surface 123 of the optical pattern 121, it is possible to increase the lateral contrast ratio while minimizing a decrease in the front contrast ratio compared to a contrast ratio improving layer in which no light absorption layer is formed.

The light absorption layer 130 may have a refractive index ranging from 1.3 to 2.0, for example, from 1.4 to 1.7. In the above range, it is possible to improve the front contrast ratio.

The light absorption layer 130 may have a thickness of 5 μm or less and, for example, from 1 μm to 4 μm. In the above range, the light absorption layer 130 may be used in the contrast ratio improving film, and it is possible to prevent the contrast ratio and/or the luminance from being decreased due to an excessive thickness.

The light absorption layer 130 may contain a light-absorbing material. The light-absorbing material may include a conventional light-absorbing material known to those skilled in the art. For example, the light-absorbing material may include carbon black, a black pigment, and the like. The light absorption layer 130 may be formed of a resin composition containing a light-absorbing material. The resin is not particularly limited as long as it is capable of providing the minimal reflectance of the present invention compared to the first resin layer and the second resin layer. For example, an acrylic resin may be used.

First Resin Layer

The first resin layer 110A may diffuse light by refracting light incident from a lower surface of an optical display device in various directions according to an incident position. At least a portion of the first resin layer 110A may be formed in direct contact with the second resin layer 120A.

The first resin layer 110A may include a filling pattern 111 for filling at least a portion of the optical pattern 121. The "filling of at least a portion" includes fully filling the optical pattern or partially filling the optical pattern. When the filling pattern partially fills the optical pattern, the remaining portion may be filled with air or a resin having a predetermined refractive index. In detail, the resin may have a refractive index greater than or equal to that of the first resin layer and less than or equal to that of the second resin layer.

Figure 4:
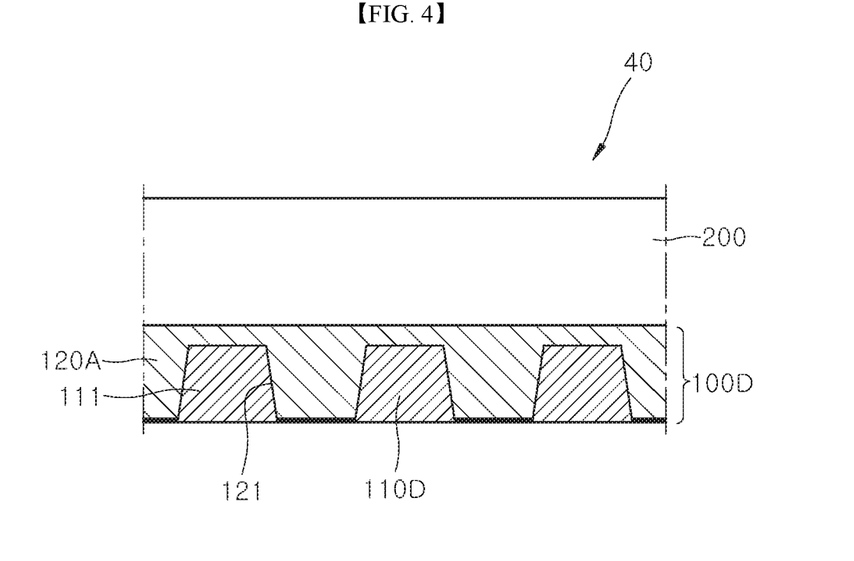
FIG. 4 is a sectional view of a contrast ratio improving film according to yet another embodiment of the present invention.

The first resin layer 110A may be a layer containing the filling pattern 111. However, the first resin layer 110A may contain only the filling pattern 111 as shown in FIG. 4.

The refractive index of the first resin layer 110A may be less than 1.52 and specifically from 1.35 to 1.50. In the above range, it is possible to increase light diffusion, easily perform manufacturing, and improve polarized light diffusion and a contrast ratio. The first resin layer 110A may be formed of a UV curable composition or a thermosetting composition containing a transparent resin. In detail, the resin may include one or more of (meth)acrylic resins, polycarbonate-based resins, silicone-based resins, and epoxy-based resins, but the present invention is not limited thereto. The transparent resin may have a light transmittance of 90% or higher after curing.

The contrast ratio improving layer 110A may have a thickness ranging from 5 μm to 100 μm, specifically from 10 μm to 60 μm, and more specifically from 20 μm to 45 μm. In the above range, the contrast ratio improving layer 100A may be used for an optical display device.

The contrast ratio improving layer 100A may be stacked on a protective layer 100.

In a specific example, the second resin layer may be a non-viscous layer with no viscosity. In this case, one or more viscous layers, adhesive layers, or viscous adhesive layers may be formed between the second resin layer 120A and the protective layer 100. In another specific example, the second resin layer may be self-viscous. In this case, the second resin layer 120A may be formed directly on the protective layer 100. When the second resin layer is self-viscous, the second resin layer may be formed of one or more of an acrylic resin, an epoxy resin, and urethane resin.

Protective Layer

The protective layer 200 may be formed on the contrast ratio improving layer 100A to support the contrast ratio improving layer 100A and emit light from the contrast ratio improving layer 100A. The protective layer 200 is formed on the light exit surface of the contrast ratio improving layer 100A.

The protective layer 200 may contain one or more of a protective film and a protective coating layer that are optically transparent.

When the protective layer is a protective film type, the protective layer 200 may contain a protective film formed of an optically transparent resin. The protective film may be formed by melting and extruding the resin. If necessary, a stretching process may be further performed. The resin may contain one or more of cellulose ester-based resins including triacetyl cellulose, cyclic polyolefin-based resins including amorphous cyclic polyolefins (cyclic olefin polymer (COP)), polycarbonate-based resins, polyester-based resins including polyethylene terephthalate (PET), polyether sulfone-based resins, polysulfone-based resins, polyamide-based resins, polyimide-based resins, acyclic polyolefin-based resins, polyacrylate-based resins including polymethyl methacrylate resins, polyvinyl alcohol-based resins, polyvinyl chloride-based resins, and polyvinylidene chloride-based resins.

The protective film may be a non-stretched film, but a retardation film or an isotropic optical film having a predetermined range of retardation which is obtained by stretching the resin by a predetermined method. In a specific example, the protective film may have a retardation Re of 8,000 nm or greater, specifically 10,000 nm or greater, more specifically more than 10,000 nm, and much more specifically from 10,100 nm to 15,000 nm. In the above range, it is possible to prevent rainbow stains from being recognized and also to increase light diffusion through the contrast ratio improving layer. In a specific example, the protective film may be an isotropic optical film having a retardation Re of 60 nm or less, specifically from 0 nm to 60 nm, and more specifically from 40 nm to 60 nm. In the above range, it is possible to enhance image quality by compensating for a viewing angle. The term "isotropic optical film" refers to a film having nx, ny, and nz which are substantially the same as each other, and the term "substantially the same" includes a case in which a few errors are present as well as a case in which they are exactly the same.

Although not shown in FIG. 1, the protective film may include a base film and a primer layer formed on at least one surface of the base film. The ratio of the refractive index of the primer layer to the refractive index of the base film (the refractive index of the primer layer/the refractive index of the base film) may be 1.0 or less, specifically from 0.6 to 1.0, more specifically from 0.69 to 0.95, much more specifically from 0.7 to 0.9, and even much more specifically from 0.72 to 0.88. In the above range, it is possible to increase the transmittance of a first base layer. The base film has a refractive index ranging from 1.3 to 1.7 and specifically from 1.4 to 1.6. In the above range, it is possible to use the base film as the base film of the first base layer, easily control the refractive index with respect to the primer layer, and increase the transmittance of the first base layer. The base film may include films formed of the above-described resins. The primer layer may have a refractive index ranging from 1.0 to 1.6, specifically from 1.1 to 1.6, and more specifically from 1.1 to 1.5. In the above range, the primer layer may have an appropriate refractive index compared to the base film, and thus it is possible to increase the transmittance of the base layer. The primer layer may have a thickness from 1 nm to 200 nm and specifically from 60 nm to 200 nm. In the above range, the primer layer may be used in the optical film and may have an appropriate refractive index compared to the base film. Thus, it is possible to increase the transmittance of the base layer and remove the "brittle" phenomenon. The primer layer may be a non-urethane-based primer layer containing no urethane group. In detail, the primer layer may be formed of a primer layer composition including a monomer or a resin such as polyester and acryl. The refractive index may be provided by controlling mixing ratios (e.g., mole fractions) of these monomers. The primer layer composition may further contain one or more types of additives such as a UV absorber, an antistatic agent, an antifoaming agent, a surfactant, etc.

When the protective layer is a protective coating layer type, it is possible to increase adhesion to the second resin layer, transparency, mechanical strength, thermal stability, moisture proof, and durability. In a specific example, the protective coating layer may be formed of an active energy ray curable resin composition containing an active energy ray curable compound and a polymerization initiator.

The active energy ray curable compound may include one or more of a cationically polymerizable curable compound, a radically polymerizable curable compound, a urethane resin, and a silicone-based resin. The cationically polymerizable curable compound may be an epoxy-based compound having at least one epoxy group in a molecule and an oxetane-based compound having at least one oxetane ring in a molecule. The radically polymerizable curable compound may be a (meth)acrylic compound having at least one (meth)acryloyloxy group in a molecule.

The epoxy-based compound may include one or more of hydrogenated epoxy-based compounds, chain aliphatic epoxy-based compounds, cyclic aliphatic epoxy-based compounds, and aromatic epoxy-based compounds.

The radically polymerizable curable compound may implement a protective coating layer having excellent hardness and mechanical strength and high durability. The radically polymerizable curable compound may include (meth)acrylate monomers having at least one (meth)acryloyloxy group in a molecule and (meth)acrylate oligomers obtained by reacting two or more kinds of functional group-containing compounds and having at least two (meth)acryloyloxy groups in a molecule. The (meth)acrylate monomers may include monofunctional (meth)acrylate monomers having one (meth)acryloyloxy group in a molecule, bifunctional (meth)acrylate monomers having two (meth)acryloyloxy groups in a molecule, and polyfunctional (meth)acrylate monomers having three or more (meth)acryloyloxy groups in a molecule. The (meth)acrylate oligomers may include a urethane (meth)acrylate oligomer, a polyester (meth)acrylate oligomer, an epoxy (meth)acrylate oligomer, and the like.

The polymerization initiator may cure the active energy ray curable compound. The polymerization initiator may include one or more of a photocationic initiator, a photosensitizer, and the like. The photocationic initiator may be conventionally known to those skilled in the art. In detail, the photocationic initiator may use an onium salt containing a positive ion and a negative ion. In detail, the positive ion may include diaryl iodonium such as diphenyl iodonium, 4-methoxydiphenyl iodonium, bis(4-methylphenyl) iodium, bis(4-tert-butylphenyl) iodonium, bis(dodecylphenyl) iodium, and (4-methylphenyl) [(4-(2-methylpropyl) phenyl) iodonium, triarylsulfonium such as triphenylsulfonium and diphenyl-4-thiophenoxyphenylsulfonium, bis[4-(diphenylsulfonio) phenyl] sulfide, and the like. In detail, the negative ion may include hexafluorophosphate ($PF_6-$), tetrafluoroborate ($BF_4-$), hexafluoroantimonate ($SbF_6-$), hexafluoroarsenate ($AsF_6-$), hexachloroantimonate ($SbCl_6-$), and the like. The photosensitizer may be conventionally known to those skilled in the art. In detail, the photosensitizer may use one or more of thioxanthone-based agents, phosphorus-based agents, triazine-based agents, acetophenone-based agents, benzophenone-based agents, benzoin-based agents, and oxime-based agents.

The active energy ray curable resin composition may further include conventional additives such as silicone-based leveling agents, UV absorbers, antistatic agents, and the like.

The protective layer 200 may have a thickness ranging from 5 μm to 200 μm and specifically from 30 μm to 120 μm. The thickness may range from 20 μm to 100 μm when the protective layer 200 is a protective film type and may range from 5 μm to 50 μm when the protective layer 200 is a protective coating layer type. In the above range, the protective layer 200 may be used for a light emitting display device.

A functional coating layer such as a primer layer, a hard coating layer, an anti-fingerprint layer, and an anti-reflection layer may be further formed on at least one surface of the protective layer. The primer layer may enhance adhesion between a polarizer and a protective layer. The hard coating layer, the anti-fingerprint layer, the anti-reflection layer, and the like may provide additional functions to the protective layer, the polarizing film, etc.

The contrast ratio improving optical film 10 may have a thickness ranging from 30 μm to 250 μm, for example, from 50 μm to 200 μm. In the above range, it is possible to improve the front contrast ratio.

The contrast ratio improving optical film 10 may be manufactured by conventional methods known to those skilled in the art. For example, the contrast ratio improving optical film may be formed by coating the protective layer with a second resin layer specific resin, applying the optical pattern and the flat part, and performing curing to form a second resin layer, transferring a light absorption layer to the flat part by a method of transferring an optical absorbing layer or the like, filling and coating the optical pattern with a first resin layer specific resin, and then performing curing, but the present invention is not limited thereto.

Figure 2:
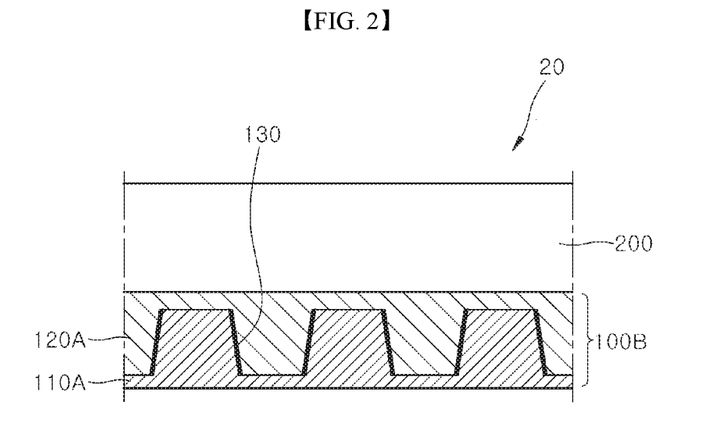
FIG. 2 is a sectional view of a contrast ratio improving film according to another embodiment of the present invention.

A contrast ratio improving film according to another embodiment of the present invention will be described below with reference to FIG. 2. FIG. 2 is a sectional view of the contrast ratio improving film according to another embodiment of the present invention.

Referring to FIG. 2, a contrast ratio improving film 20 is substantially the same as the contrast ratio improving film 10 according to an embodiment of the present invention except that the contrast ratio improving film 20 includes a contrast ratio improving layer 100B in which a light absorption layer 130 is formed on an inclined surface of an optical pattern and no light absorption layer is formed on a flat part. By the light absorption layer 130 being formed on the inclined surface and no light absorption layer being formed on the flat part, it is possible to prevent a decrease in luminance and further minimize a decrease in the front contrast ratio.

The light absorption layer 130 is formed on at least a portion of the inclined surface. For example, the light absorption layer may be formed to occupy 10% to 100% of the inclined surface. In the above range, light incident from the flat part onto the inclined surface is absorbed by the light absorption layer and totally reflected, and thus it is possible to minimize a decrease in the front contrast ratio. Preferably, the light absorption layer may be formed to occupy 50% to 100% of the inclined surface. In the above range, it is possible to enable light refraction on the inclined surface to further improve the lateral contrast ratio and enhance visibility.

The light absorption layer 130 may have a thickness of 5 μm or less, for example, from 1 μm to 4 μm. In the above range, it is possible to prevent luminance loss due to the light absorption layer on the inclined surface.

The contrast ratio improving optical film 20 may be manufactured by conventional methods. For example, the contrast ratio improving optical film 20 may be formed in substantially the same method as that of the contrast ratio improving optical film 10 except that the light absorption layer is formed in a soft-molding method.

Figure 3:
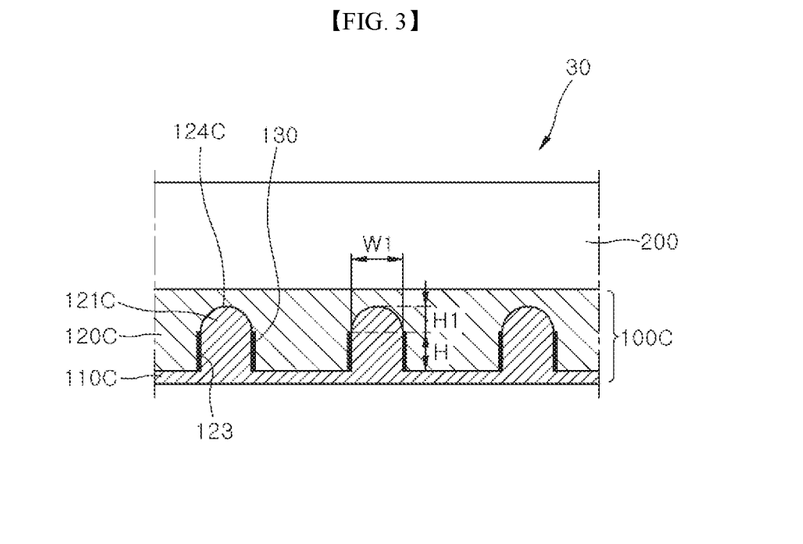
FIG. 3 is a sectional view of a contrast ratio improving film according to still another embodiment of the present invention.

A contrast ratio improving film according to still another embodiment of the present invention will be described below with reference to FIG. 3. FIG. 3 is a sectional view of the contrast ratio improving film according to still another embodiment of the present invention.

Referring to FIG. 3, a contrast ratio improving optical film 30 may be substantially the same as the contrast ratio improving film 10 according to an embodiment of the present invention except that the contrast ratio improving optical film 30 includes a contrast ratio improving layer 100c in which a light absorption layer 130 is formed on an inclined surface 123 and no light absorption layer is formed on a flat part and which includes a second resin layer 120C including an optical pattern 121C having a first surface 124C formed to be curved and a first resin layer 110C facing the second resin layer 120C.

By the light absorption layer 130 being formed on the inclined surface 123 of the optical pattern 121C and no light absorption layer being formed on the flat part, it is possible to prevent a decrease in luminance and further minimize a decrease in the front contrast ratio.

The curved surface is formed on an outermost portion of the optical pattern 121C in a convex shape in the direction in which light is emitted in the contrast ratio improving optical film. Accordingly, by further diffusing and emitting incident light using the curved surface finally; it is possible to further increase visibility improvement.

The radius of curvature of the curved surface may range 1 μm to 50 μm and, for example, from 2 μm to 25 μm. In the above range, it is possible to improve visibility.

The optical pattern 121C may be composed of a first sub-optical pattern formed of or including the first surface 124C and a second sub-optical pattern including both inclined surfaces 123 connected to the first sub-optical pattern. FIG. 3 shows the optical pattern composed of the first surface 124C and the inclined surface 123 directly connected to the first surface 124C. FIG. 3 shows that the first surface 124C is hemispherical (semicircular), but the present invention is not limited thereto.

The first sub-optical pattern may have a height H1 of 20 μm or less, for example, from 2 μm to 10 μm. In the above range, it is possible to improve visibility. In FIG. 3, the height of the second sub-optical pattern is represented by H2, and the total height of the optical pattern 121C is represented by H1+H2.

The first sub-optical pattern may have a maximal width W1 ranging from 1 μm to 30 μm, for example, from 2 μm to 20 μm. In the above range, it is possible to improve visibility. The maximal width W1 of the first sub-optical pattern may be the same as or different from that of the second sub-optical pattern.

The ratio of the height H1 to the maximal width W1 of the first sub-optical pattern may range from 0.2 to 5 and, for example, from 0.5 to 3. In the above range, it is possible to improve visibility.

FIG. 3 shows that a light absorption layer is formed on an inclined surface of an optical pattern and no light absorption layer is formed on a flat part. However, as shown in FIG. 1, a case in which a light absorption layer is formed on a flat part and no light absorption layer is formed on an inclined surface may fall within the scope of the present invention.

A contrast ratio improving optical film according to yet another embodiment of the present invention will be described below with reference to FIG. 4. FIG. 4 is a sectional view of the contrast ratio improving optical film according to yet another embodiment of the present invention.

Referring to FIG. 4, a contrast ratio improving optical film 40 is substantially the same as the contrast ratio improving optical film 10 according to an embodiment of the present invention except that the contrast ratio improving optical film 40 includes a contrast ratio improving layer 100D in which the maximal height of an optical pattern 121 is the same as the thickness of a first resin layer 110D. FIG. 4 shows that the first resin layer 110D is composed of only the filling pattern 111.

FIG. 4 shows that a light absorption layer is formed on a flat part and no light absorption layer is formed on an inclined surface. However, a case in which a light absorption layer is formed on an inclined surface and no light absorption layer is formed on a flat part may fall within the scope of the present invention.

Figure 5:
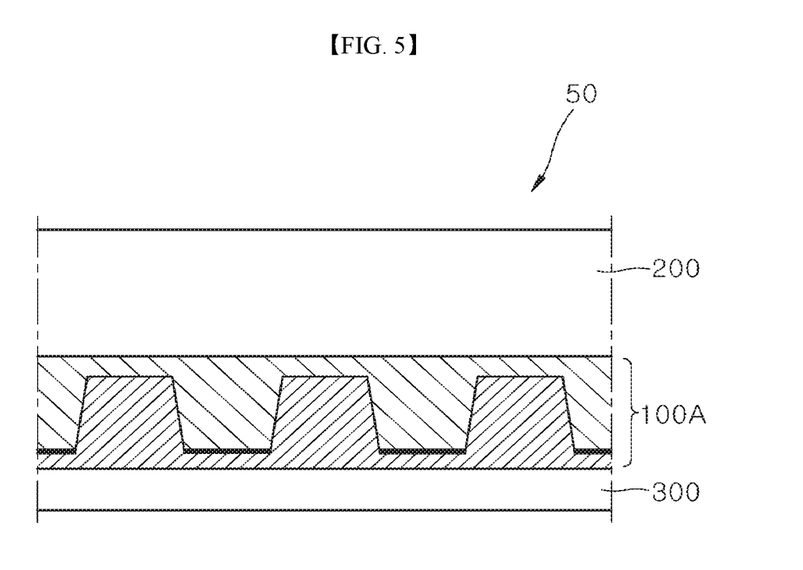
FIG. 5 is a sectional view of a polarizing plate according to an embodiment of the present invention.

A polarizing plate according to an embodiment of the present invention will be described below with reference to FIG. 5. FIG. 5 is a sectional view of the polarizing plate according to an embodiment of the present invention.

Referring to FIG. 5, a polarizing plate 50 may include a polarizing film 300, a contrast ratio improving layer 100A, and a protective layer 200.

Since the polarizing plate 50 includes the contrast ratio improving layer 100A, it is possible to suppress total reflection of light incident from a flat part by a light absorption layer to minimize a decrease in the front contrast ratio. Also, since the polarizing plate 50 diffuses light incident from a first resin layer by an optical pattern, it is possible to obtain an increase in the lateral contrast ratio. In the following Equation 2, the polarizing plate may have a contrast ratio gain of 1.05 or more, for example, from 1.05 to 1.8. In the above range, by increasing the lateral contrast ratio and decreasing the front contrast ratio, it is possible to increase visibility at both the front side and the lateral side in a liquid crystal display device.

$$\text{Contrast ratio gain} = \text{Lateral relative contrast ratio} \times \text{Front relative contrast ratio,} \quad \text{[Equation 2]}$$

wherein the front relative contrast ratio is the ratio of the front contrast ratio of the polarizing plate including the contrast ratio improving layer to the front contrast ratio of the polarizing plate not including the contrast ratio improving layer, and the lateral relative contrast ratio is the ratio of the lateral contrast ratio of the polarizing plate including the contrast ratio improving layer to the lateral contrast ratio of the polarizing plate not including the contrast ratio improving layer.

The polarizing plate 50 may be used as a viewer-side polarizing plate in a liquid crystal display device. Accordingly, the polarizing plate 50 is affected by external light such as sunlight or illumination when the liquid crystal display device is not driven. The polarizing film 300 and the contrast ratio improving layer 100A are sequentially stacked on the polarizing plate 50, and the contrast ratio improving layer 100A may have a minimal reflectance of 0.5% or less. Accordingly, the polarizing plate 50 prevents external light from being scattered or distributed by the optical pattern in the first resin layer and the second resin layer when external light is incident on the polarizing plate while the liquid crystal display device is not driven in order to prevent mura or stains from appearing on the screen of the liquid crystal display device or prevent the screen from being split. Thus, it is possible to enhance appearance or enhance black visibility even in the non-driven state. As the minimal reflectance decreases, the above-described appearance improvement and black visibility enhancement may increase.

In particular, by using the stacked polarizing film 300 and the contrast ratio improving layer 100A, the polarizing plate 50 may suppress appearance damage due to external light when the liquid crystal display device is not driven and may improve visibility due to the contrast ratio improving layer 100A when the liquid crystal display device is driven. Thus, it is possible to obtain improvement both in the driving state and in the non-driving state.

Polarizing Film

The polarizing film 300 may polarize light incident from a liquid crystal panel and transmit the light. The polarizing film 300 is formed on a light entrance surface of the contrast ratio improving layer 100A.

The polarizing film 300 may include a polarizer. In detail, the polarizer may include a polyvinyl alcohol-based polarizer manufactured by uniaxially stretching of a polyvinyl alcohol-based film or a polyene-based polarizer manufactured by dehydrating a polyvinyl alcohol-based film. The polarizer may have a thickness of 5 μm to 40 μm. In the above range, the polarizer may be used for an optical display device.

The polarizing film 300 may include a polarizer and a protective layer formed on at least one surface of the polarizer. The protective layer may protect the polarizer to increase reliability of the polarizing plate and the mechanical strength of the polarizing plate. The protective layer is substantially the same as that described above for the contrast ratio improving layer. Preferably, the protective layer may be a polyester protective film (e.g., a polyethylene terephthalate film) having a retardation Re ranging from 8,000 nm or more, specifically 10,000 nm or more, more specifically more than 10,000 nm, and even more specifically from 10,100 nm to 15,000 nm.

The contrast ratio improving layer 100A may be formed on the polarizing film 300.

In a specific example, the first resin layer may be a non-viscous layer with no viscosity. In this case, one or more viscous layers, adhesive layers, or viscous adhesive layers may be formed between the first resin layer 110A and the polarizing film 300. In another specific example, the first resin layer may be self-viscous. In this case, the first resin layer 110A may be formed directly on the polarizing film 300. When the first resin layer is self-viscous, the second resin layer may be formed of one or more of an acrylic resin, an epoxy resin, and urethane resin.

Although not shown in FIG. 5, a viscous layer is formed on a lower surface of the polarizing film 300 to attach the polarizing plate to the liquid crystal panel.

Although not shown in FIG. 5, one or more protective layers, antireflection films, and the like may be further stacked on the light exit surface of the contrast ratio improving layer 300 due to the viscous layer.

The liquid crystal display device of the present invention may include the polarizing plate of the present invention. In a specific example, a polarizing plate at a viewer side with respect to the liquid crystal panel may be included as the polarizing plate. The "viewer-side polarizing plate" is disposed opposite to a screen side, i.e., a light source side with respect to the liquid crystal panel.

In a specific example, a backlight unit, a first polarizing plate, a liquid crystal panel, and a second polarizing plate are sequentially stacked on the liquid crystal display device, and the second polarizing plate may include the polarizing plate of the present invention. The liquid crystal panel may employ a vertical alignment (VA) mode, an IPS mode, a patterned vertical alignment mode (PVA), or a super-patterned vertical alignment (S-PVA) mode, but the present invention is not limited thereto.

In another specific example, a polarizing plate at a light source side with respect to the liquid crystal panel may be included as the polarizing plate. The "light source-side polarizing plate" is disposed at a light source side with respect to the liquid crystal panel.

In still another specific example, the viewer-side polarizing plate and the light source-side polarizing plate with respect to the liquid crystal panel may include the polarizing plate of the present invention. Preferably, the polarizing plate at the light source side with respect to the liquid crystal panel may include the polarizing plate of the present invention in which the light absorption layer is formed not on the flat part but on the inclined surface, and the polarizing plate at the viewer side with respect to the liquid crystal panel may include the polarizing plate of the present invention in which the light absorption layer is formed not on the inclined surface but on the light absorption layer. Thus, by lowering the degree of total reflection of light emitted toward the light source, it is possible to emit the light with increased light use efficiency through the liquid crystal panel. Also, by diffusing the light at the viewer side, it is possible to enhance visibility.

Hereinafter, preferred embodiments of the present invention will be described in detail with the configurations and actions of the present invention. However, the following embodiments are provided to aid the understanding of the present invention, and the scope of the present invention is not limited to the following embodiment.

Embodiment 1

By coating one surface of a protective layer-specific polyethylene terephthalate (PET) film (Toyobo, Thickness=80 and Re=14,000 nm at a wavelength of 550 nm) with a UV curable resin (SSC-5760, SHIN-A T&C), applying an engraved pattern and a flat part to a coating layer using a film having a pattern part including an optical pattern having the same base angle at both ends and a flat part formed between such optical patterns, and then performing curing, a second resin layer (having a refractive index of 1.57) including a pattern part having the flat part and the engraved pattern (of which a section is a trapezoidal engraved pattern of FIG. 1) having the same base angle at both ends was formed as shown in the following Table 1.

By bringing a transfer sheet having a light absorption layer including a carbon black and an acrylic resin into contact with the flat part, the light absorption layer was formed on the entirety of the flat part. No light absorption layer is formed on the inclined surface of the engraved pattern.

By fully filling the engraved pattern with a UV curable resin (SSC-4560, SHIN-A T&C), applying the UV curable resin (SSC-4560, SHIN-A T&C) onto the light absorption layer to a predetermined thickness, and then performing curing, a contrast ratio improving optical film having a first resin layer (having a refractive index of 1.47) having a filling pattern to fully fill the engraved pattern was manufactured.

By stretching a polyvinyl alcohol film by a factor of 3 at 60° C., adsorbing iodine to the polyvinyl alcohol film, and then stretching the polyvinyl alcohol film by a factor of 2.5 in an aqueous boric acid solution at 40° C., a polarizer was manufactured.

By forming a viscous layer on one surface of the polarizer and attaching the first resin layer of the contrast ratio improving optical film of the viscous layer, a polarizing plate was manufactured.

Embodiment 2

In Embodiment 1, by forming a pattern part having a flat part and an optical pattern of Table 1 below and forming a light absorption layer on the flat part, a contrast ratio improving optical film was manufactured. A polarizing plate was manufactured using the manufactured contrast ratio improving optical film in the same method as described in Embodiment 1.

Embodiment 3

In Embodiment 1, by forming a pattern part having a flat part and an optical pattern of Table 1 below and forming a light absorption layer on the entirety of the flat part, a contrast ratio improving optical film having no light absorption layer formed on the flat part was manufactured. The light absorption layer was manufactured in a soft-molding method. A polarizing plate was manufactured using the manufactured contrast ratio improving optical film in the same method as described in Embodiment 1.

Embodiments 4 to 6

In Embodiment 1, by forming a pattern part having a flat part and an optical pattern of Table 2 below and forming a light absorption layer on the entirety of the flat part, a contrast ratio improving optical film having no light absorption layer formed on the flat part was manufactured. The light absorption layer was manufactured in a soft-molding method. A polarizing plate was manufactured using the manufactured contrast ratio improving optical film in the same method as described in Embodiment 1.

Comparative Example 1

A contrast ratio improving optical film and a polarizing plate were manufactured in the same method as described in Embodiment 1 except that no light absorption layer is formed in both of a flat part and an inclined surface.

Comparative Example 2

A contrast ratio improving optical film and a polarizing plate were manufactured in the same method as described in Embodiment 1 except that a light absorption layer is formed in both of a flat part and an inclined surface.

Comparative Example 3

A contrast ratio improving optical film and a polarizing plate were manufactured in the same method as described in Embodiment 4 except that no light absorption layer is formed.

Comparative Example 4

A contrast ratio improving optical film and a polarizing plate were manufactured in the same method as described in Embodiment 4 except that a light absorption layer is formed in both of a flat part and an inclined surface.

Reference 1

A polarizing plate was manufactured in the same method as described in Embodiment 1 except that no contrast ratio improving layer is formed.

The physical properties of the contrast ratio improving optical films and the polarizing plates of the embodiments and the comparative examples were evaluated as the following Table 1 and Table 2. The result was shown in the following Table 1 and Table 2.

(1) Minimal Reflectance: A specimen was manufactured by laminating a black acrylic sheet (Nitto Jushi Kogyo, CLAREX) on a lower surface of a first resin layer of each of the contrast ratio improving optical films of the embodiments and comparative examples at 70° C. A minimal reflectance was measured at a wavelength of 360 nm to 740 nm in a reflective mode by using a reflectance measuring instrument (UV/VIS spectrometer Lambda 1050 of Perkin Elmer). The minimal reflectance was measured at the protective layer side.

(2) Front Luminance, Relative Luminance, Front Contrast Ratio, and Lateral Contrast Ratio: modules for a liquid crystal display device were manufactured and evaluated in the following method.

Manufacturing Example 1: Manufacturing of First Polarizing Plate

By stretching a polyvinyl alcohol film by a factor of 3 at 60° C., adsorbing iodine to the polyvinyl alcohol film, and then stretching the polyvinyl alcohol film by a factor of 2.5 in an aqueous boric acid solution at 40° C., a first polarizer was manufactured. A first polarizing plate was manufactured by adhering a triacetyl cellulose film (having a thickness of 80 µm) as a base layer to both surfaces of the first polarizer using a polarizing plate adhesive (Z-200, Nippon Goshei).

Manufacturing Example 2: Manufacturing of Modules for Liquid Crystal Display Device By sequentially assembling the first polarizing plate of Manufacturing Example 1, a liquid crystal panel (PVA mode), and the polarizing plate manufactured in each of the embodiments and the comparative examples, the modules for a liquid crystal display device were manufactured. A viewer-side polarizing plate was assembled as the polarizing plates manufactured in the embodiments and the comparative examples, and an antireflective film was disposed at an outermost side at a viewer side.

A liquid crystal display device including a one-side edge-type light emitting device (LED) light source (which had the same configuration as Samsung LED TV (UN32H5500) except for configurations of the modules for the liquid crystal display device of the embodiments and the comparative examples) was manufactured by assembling an LED light source, a light guide plate, and the modules for the liquid crystal display.

A front luminance value was measured in a white mode at (0°, 0°) in the spherical coordinate system using EZCONTRAST X88RC (EZXL-176R-F422A4, ELDIM). The relative luminance was calculated by {(front luminance value in the embodiment or comparative example)/(front luminance value of Reference 1)}×100.

Luminance values were measured in a white mode and a block mode at (0°, 0°) and (0°, 60°) in the spherical coordinate system using EZCONTRAST X88RC (EZXL-176R-F422A4, ELDIM). The front contrast ratio was calculated using the ratio of the luminance value in the white mode to the luminance value in the black mode at (0°, 0°) in the spherical coordinate system. The lateral contrast ratio was calculated using the ratio of the luminance value in the white mode to the luminance value in the black mode at (0°, 60°) in the spherical coordinate system. The front relative contrast ratio was calculated by (Front contrast ratio of Embodiment or Comparative Example)/(Front contrast ratio of Reference 1). The lateral relative contrast ratio was calculated by (Lateral contrast ratio of Embodiment or Comparative Example)/(Lateral contrast ratio of Reference 1).

TABLE 1

| | | Embodiment 1 | Embodiment 2 | Embodiment 3 | Comparative Example 1 | Comparative Example 2 | Reference 1 |
|---|---|---|---|---|---|---|---|
| Second Resin Layer | Optical Pattern | Trapezoid | Trapezoid | Rectangle | Trapezoid | Trapezoid | — |
| | Maximal Height H of Optical Pattern (µm) | 7 | 7 | 15 | 7 | 7 | — |

TABLE 1-continued

|  |  | Embodiment 1 | Embodiment 2 | Embodiment 3 | Comparative Example 1 | Comparative Example 2 | Reference 1 |
|---|---|---|---|---|---|---|---|
|  | Maximal Width W of Optical Pattern (μm) | 7 | 7 | 7 | 7 | 7 | — |
|  | Width L of Flat Part (μm) | 7 | 3 | 9.9 | 7 | 7 | — |
|  | Periodic Interval P (μm) | 14 | 10 | 16.9 | 14 | 14 | — |
|  | Base Angle (°) | 84 | 84 | 90 | 84 | 84 | — |
| Formation Location of Light absorption layer |  | Flat Part | Flat Part | Inclined Surface | — | Flat Part & Inclined Surface | — |
| Minimal Reflectance (%) |  | 0.066 | 0.110 | 0.147 | 0.3 | 0.084 | 0.3 |
| Front Luminance (nits) |  | 146 | 242 | 326 | 331 | 168 | 333 |
| Relative Luminance (%) |  | 44 | 73 | 98 | 100 | 56 | 100 |
| Front Contrast Ratio (0°, 0°) |  | 4532 | 4530 | 4534 | 3816 | 4533 | 4533 |
| Front Relative Contrast Ratio |  | 1.00 | 1.00 | 1.00 | 0.84 | 1.00 | 1.00 |
| Lateral Contrast Ratio (0°, 60°) |  | 335 | 261 | 201 | 292 | 192 | 192 |
| Lateral Relative Contrast Ratio |  | 1.74 | 1.36 | 1.05 | 1.52 | 1.00 | 1.00 |
| Contrast Ratio Gain of Equation 2 |  | 1.74 | 1.36 | 1.05 | 1.28 | 1.00 | 1.00 |

TABLE 2

|  |  | Embodiment 4 | Embodiment 5 | Embodiment 6 | Comparative Example 3 | Comparative Example 4 | Reference 1 |
|---|---|---|---|---|---|---|---|
| Second Resin Layer | Optical Pattern* | FIG. 3 | FIG. 3 | FIG. 3 | FIG. 3 | FIG. 3 | — |
|  | Maximal Height H1 of First Sub-optical Pattern (μm) | 3.5 | 3.5 | 3.5 | 3.5 | 3.5 | — |
|  | Maximal Height H2 of Second Sub-optical Pattern (μm) | 5 | 1 | 15 | 5 | 5 | — |
|  | Maximal Height H1 + H2 of Optical Pattern (μm) | 8.5 | 4.5 | 18.5 | 8.5 | 8.5 | — |
|  | Maximal Width W and W1 of Optical Pattern (μm) | 7 | 7 | 7 | 7 | 7 | — |
|  | Width L of Flat Part (μm) | 7 | 7 | 7 | 7 | 7 | — |

TABLE 2-continued

|  | Embodiment 4 | Embodiment 5 | Embodiment 6 | Comparative Example 3 | Comparative Example 4 | Reference 1 |
|---|---|---|---|---|---|---|
| Periodic Interval P (μm) | 14 | 14 | 14 | 14 | 14 | — |
| Base Angle (°) | 90 | 90 | 90 | 90 | 90 | — |
| Formation Location of Light absorption layer | Inclined Surface | Inclined Surface | Inclined Surface | — | Inclined Surface & Flat part | — |
| Minimal Reflectance (%) | 0.3 | 0.3 | 0.3 | 0.3 | 0.075 | 0.3 |
| Front Luminance (nits) | 297 | 283 | 269 | 315 | 165 | 333 |
| Relative Luminance (%) | 89 | 85 | 81 | 95 | 50 | 100 |
| Front Contrast Ratio (0°, 0°) | 3870 | 3943 | 4330 | 3134 | 4533 | 4533 |
| Front Relative Contrast Ratio | 0.85 | 0.87 | 0.96 | 0.69 | 1.00 | 1.00 |
| Lateral Contrast Ratio (0°, 60°) | 249 | 343 | 473 | 301 | 192 | 192 |
| Lateral Relative Contrast Ratio | 1.30 | 1.79 | 2.46 | 1.57 | 1.00 | 1.00 |
| Contrast Ratio Gain of Equation 2 | 1.11 | 1.56 | 2.36 | 1.08 | 1.00 | 1.00 |

* Optical pattern: An optical pattern having both hemispherical sides to which an inclined surface (a flat surface) is directly connected as shown in FIG. 3.

As shown in Table 1 and Table 2, the contrast ratio improving optical film according to this embodiment may increase both of the lateral contrast ratio and the front contrast ratio. Also, even when external light such as sunlight or illumination is emitted while the liquid crystal display device is not driven, it is possible to enhance appearance by improving black visibility and preventing rainbow mura or stains from being recognized due to a small minimal reflectance. By the light absorption layer being formed on the flat part or the inclined surface as shown in Table 1, it is possible to lower the minimal reflectance and also increase both of the front contrast ratio and the lateral contrast ratio.

Simple modifications or changes of the present invention can be easily carried out by those skilled in the art, and all such modifications or changes can be seen as falling within the scope of the present invention.

The invention claimed is:

1. A contrast ratio improving optical film comprising a contrast ratio improving layer,
wherein,
the contrast ratio improving layer comprises a first resin layer and a second resin layer facing the first resin layer,
the second resin layer comprises a pattern part having optical patterns and a flat part between the optical patterns,
the optical patterns have at least one inclined surface with respect to the flat part,
the flat part or the inclined surface has a light absorption layer formed thereon, the light absorption layer being between a light exit surface of the first resin layer and the flat part or the inclined surface, and
the contrast ratio improving optical film has a minimal reflectance of 0.5% or less.

2. The contrast ratio improving optical film of claim 1, wherein the pattern part satisfies the following Equation 1, and the optical pattern has a base angle ranging from 75° to 90°, $$1 < P/W \leq 10,$$ [Equation 1]

where P is a periodic interval of the pattern part (in units of μm), and W is a maximal width of the optical pattern (in units of μm).

3. The contrast ratio improving optical film of claim 1, wherein the optical pattern has a trapezoidal, rectangular, or a square section in which two neighboring inclined surfaces are connected by a first surface.

4. The contrast ratio improving optical film of claim 1, wherein the optical pattern has an aspect ratio H/W ranging from 0.3 to 3.0,
where H is a height of the optical pattern, and W is a width of the optical pattern.

5. The contrast ratio improving optical film of claim 1, wherein the second resin layer and the first resin layer have a refractive index difference ranging from 0.05 to 0.20.

6. The contrast ratio improving optical film of claim 1, wherein the light absorption layer is formed on the flat part.

7. The contrast ratio improving optical film of claim 1, wherein the light absorption layer is formed on the inclined surface.

8. The contrast ratio improving optical film of claim 1, wherein the light absorption layer has a refractive index ranging from 1.3 to 2.0.

9. The contrast ratio improving optical film of claim 1, wherein the light absorption layer contains one or more of a carbon black and a black pigment.

10. The contrast ratio improving optical film of claim 1, wherein one or more of the first resin layer and the second resin layer are self-viscous.

11. The contrast ratio improving optical film of claim 1, further comprising a protective layer.

12. The contrast ratio improving optical film of claim 11, wherein the protective layer includes one or more of a protective film and a protective coating layer.

13. The contrast ratio improving optical film of claim 1, wherein the optical pattern includes a curved surface having a convex shape in a light emitting direction.

14. The contrast ratio improving optical film of claim 13, wherein the curved surface has a radius of curvature ranging from 1 μm to 50 μm.

15. The contrast ratio improving optical film of claim 13, wherein the light absorption layer is formed on the inclined surface of the optical pattern.

16. A polarizing plate on which a polarizing film and a contrast ratio improving optical film are sequentially stacked,
wherein,
the contrast ratio improving optical film comprises the contrast ratio improving optical film according to claim 1, and
the polarizing plate has a contrast ratio gain of 1.05 or more in the following Equation 2:

Contrast ratio gain=Lateral relative contrast ratio× Front relative contrast ratio, [Equation 2]

wherein the front relative contrast ratio is the ratio of the front contrast ratio of the polarizing plate including the contrast ratio improving layer to the front contrast ratio of the polarizing plate not including the contrast ratio improving layer, and the lateral relative contrast ratio is the ratio of the lateral contrast ratio of the polarizing plate including the contrast ratio improving layer to the lateral contrast ratio of the polarizing plate not including the contrast ratio improving layer.

17. The polarizing plate of claim 16, wherein,
the contrast ratio improving optical film is formed on a light exit surface of the polarizing film, and
one or more of a protective layer and an antireflective film are further formed on a light exit surface of the contrast ratio improving optical film.

18. A liquid crystal display device comprising the polarizing plate of claim 16.

19. The contrast ratio improving optical film of claim 1, wherein the light absorption layer has a thickness of 5 μm or less.

* * * * *